(12) United States Patent
Fideler

(10) Patent No.: US 8,055,002 B2
(45) Date of Patent: *Nov. 8, 2011

(54) METHOD AND APPARATUS FOR MODULAR HEARING AID

(75) Inventor: Brian Fideler, Jordan, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 326 days.

This patent is subject to a terminal disclaimer.

(21) Appl. No.: 12/190,499

(22) Filed: Aug. 12, 2008

(65) Prior Publication Data

US 2008/0304685 A1    Dec. 11, 2008

Related U.S. Application Data

(62) Division of application No. 10/824,775, filed on Apr. 15, 2004, now Pat. No. 7,443,992.

(51) Int. Cl.
*H04R 25/00* (2006.01)

(52) U.S. Cl. ............... 381/322; 381/324; 29/896.21

(58) Field of Classification Search ............... 381/60, 381/312, 313, 314, 322, 323, 324, 328, 380; 181/129, 130, 135; 29/896.21
See application file for complete search history.

(56) References Cited

U.S. PATENT DOCUMENTS

| | | | |
|---|---|---|---|
| 2,901,551 A | 8/1959 | Passow | |
| 3,004,113 A | 10/1961 | Christensen | |
| 3,496,306 A | 2/1970 | Pollak | |
| 3,983,336 A * | 9/1976 | Malek et al. | 381/313 |
| 4,069,400 A | 1/1978 | Johanson et al. | |
| 4,375,016 A | 2/1983 | Harada | |
| 4,395,601 A | 7/1983 | Kopke et al. | |
| 4,680,799 A | 7/1987 | Henneberger | |
| 4,706,778 A | 11/1987 | Topholm | |
| 4,870,688 A | 9/1989 | Voroba et al. | |
| 4,908,869 A | 3/1990 | Lederman | |
| 5,001,762 A | 3/1991 | Barwig et al. | |

(Continued)

FOREIGN PATENT DOCUMENTS

DE    4121311    8/1992

(Continued)

OTHER PUBLICATIONS

"U. S. Appl. No. 10/824,775, Notice of Allowance mailed Sep. 8, 2008", 4 pgs.

(Continued)

*Primary Examiner* — Huyen D Le
(74) *Attorney, Agent, or Firm* — Schwegman, Lundberg & Woessner, P.A.

(57) ABSTRACT

A method and apparatus for a modular hearing aid for a user having a hearing canal, including a housing adapted to fit within at least a portion of the hearing canal, and having at least one access port, a cover adapted for at least partially covering the at least one access port, and signal processing electronics connected to a microphone and a power supply. In various examples, a microphone housing is adapted to mount to the housing and to fit within the at least one access port, and to connect to the microphone, the signal processing electronics and the power supply. In one variant, the apparatus includes a receiver connected to the signal processing electronics, and a fastener as a unitary connector of the cover and microphone housing to the housing. Other variations are presented herein.

21 Claims, 15 Drawing Sheets

U.S. PATENT DOCUMENTS

| | | | |
|---|---|---|---|
| 5,008,943 A | 4/1991 | Arndt et al. | |
| 5,185,802 A | 2/1993 | Stanton | |
| 5,201,008 A | 4/1993 | Arndt et al. | |
| 5,204,917 A | 4/1993 | Arndt et al. | |
| 5,701,348 A | 12/1997 | Shennib et al. | |
| 5,790,672 A | 8/1998 | Klostermeier | |
| 5,799,095 A | 8/1998 | Hanright | |
| 5,875,254 A | 2/1999 | Hanright | |
| 5,889,874 A | 3/1999 | Schmitt et al. | |
| 5,915,031 A | 6/1999 | Hanright | |
| 5,923,764 A | 7/1999 | Shennib | |
| 6,088,465 A | 7/2000 | Hanright et al. | |
| 6,151,399 A | 11/2000 | Killion et al. | |
| 6,167,138 A | 12/2000 | Shennib | |
| 6,259,951 B1 | 7/2001 | Kuzma et al. | |
| 6,389,143 B1 | 5/2002 | Leedom et al. | |
| 6,430,296 B1 | 8/2002 | Olsen | |
| 6,678,385 B2 | 1/2004 | Olsen | |
| 7,039,209 B2 | 5/2006 | Schmitt | |
| 7,254,247 B2* | 8/2007 | Kragelund et al. | 381/322 |
| 7,283,640 B2 | 10/2007 | Karamuk | |
| 7,443,992 B2* | 10/2008 | Fideler | 381/328 |
| 2002/0025055 A1 | 2/2002 | Stonikas et al. | |
| 2002/0027996 A1 | 3/2002 | Leedom et al. | |
| 2003/0059074 A1 | 3/2003 | Olsen | |
| 2003/0169893 A1 | 9/2003 | Lin et al. | |
| 2005/0175203 A1 | 8/2005 | Karamuk | |
| 2006/0115105 A1* | 6/2006 | Brumback et al. | 381/328 |
| 2008/0304685 A1 | 12/2008 | Fideler | |
| 2009/0016554 A1* | 1/2009 | Fideler | 381/328 |

FOREIGN PATENT DOCUMENTS

| | | | |
|---|---|---|---|
| EP | 0279914 | | 8/1988 |
| EP | 0311233 | A2 | 12/1989 |
| EP | 0451784 | | 10/1991 |
| EP | 0263667 | | 12/1994 |
| EP | 0453200 | | 8/1995 |
| EP | 0988776 | | 3/2001 |
| EP | 1097608 | | 5/2001 |
| EP | 0927502 | | 11/2001 |
| EP | 1175811 | | 1/2002 |
| EP | 1246506 | A1 | 10/2002 |
| EP | 1315401 | A2 | 5/2003 |
| WO | WO-9013953 | | 11/1990 |
| WO | WO-9621334 | | 7/1996 |
| WO | WO-9812897 | | 3/1998 |
| WO | WO-9847319 | | 10/1998 |
| WO | WO-0004743 | | 1/2000 |
| WO | WO-0022905 | | 4/2000 |
| WO | WO-0069216 | | 11/2000 |
| WO | WO-0079834 | | 12/2000 |
| WO | WO-0079836 | | 12/2000 |
| WO | WO-0169973 | | 9/2001 |
| WO | WO-0203757 | | 1/2002 |

OTHER PUBLICATIONS

"U. S. Appl. No. 10/824,775, Response filed Feb. 2, 2008 to Non-Final Office Action mailed Oct. 1, 2007", 11 pgs.

"U. S. Appl. No. 10/824,775, Response filed Jul. 23, 2007 to Restriction Requirement mailed Mar. 16, 2007", 10 pgs.

"U. S. Appl. No. 10/824,775, Restriction Requirement mailed Mar. 16, 2007", 6 pgs.

"Canadian Application No. 2504064, Notice of Allowance Mailed Dec. 9, 2008", 1 pgs.

"European Application No. 05252380.0, European Search Report Mailed Jan. 14, 2009", 5 pgs.

"European Application No. 05252380.0, Search Report mailed Oct. 2, 2008", 4 pgs.

"Non-Final Office Action Mailed Oct. 1, 2007 in U. S. Appl. No. 10/824,775", OARN, 10.

"U.S. Appl. No. 12/240,794 Non-Final Office Action mailed Sep. 29, 2010", 10 pgs.

"U.S. Appl. No. 12/240,794, Non Final Office Action mailed Apr. 14, 2011", 12 pgs.

"U.S. Appl. No. 12/240,794, Response filed Jan. 31, 2011 to Non Final Office Action mailed Sep. 29, 2010", 8 pgs.

"European Application Serial No. 05252380.0, Examination Notification Art. 94(3) mailed Apr. 14, 2011", 4 Pgs.

"U.S. Appl. No. 12/240,794, Response filed Jul. 14, 2011 to Non-Final Office Action mailed Apr. 14, 2011", 7 pgs.

"European Application Serial No. 05252380.0, Response filed Aug. 22, 2011 to Office Action mailed Apr. 14, 2011", 20 pgs.

* cited by examiner

METHOD AND APPARATUS FOR MODULAR HEARING AID

RELATED APPLICATION

This application is a divisional of U.S. patent application Ser. No. 10/824,775 filed Apr. 15, 2004 now U.S. Pat No. 7,443,992, which is incorporated by reference and made a part hereof.

FIELD OF THE INVENTION

This disclosure relates generally to hearing aids and, more particularly, to a method and apparatus for a modular hearing aid.

BACKGROUND

One goal of hearing aids is to replicate natural hearing. To achieve this goal, hearing aids must satisfy multiple requirements. For example, hearing aids must be comfortable and discreet. Hearing aids must also improve hearing, and often times use high-tech electronics to achieve this. Finally, hearing aids should be affordable. Accordingly, a comfortable, small, affordable, and high-tech hearing aid which improves hearing is desired.

One way to improve comfort and function of a hearing aid is to custom fit components to the anatomy of the user. In some hearing aid examples, this can lower the potential for a feedback loop to form between the hearing aid speaker (the portion which produces sound for the user, also known as the hearing aid receiver) and the hearing aid microphone (the portion which gathers sound from the environment). Unfortunately, customizing components for each user is resource intensive, and increase costs. Therefore, it is desired to provide a hearing aid design which is customizable and affordable.

Hearing aid effectiveness can be further improved by customizing the sound processing function of the hearing aid to the hearing needs of the individual user. Often, hearing aid function can be customized using electronics, such as microcomputers, which gather sound with a microphone, change it in a way which is helpful to the user, and then broadcast it to the user using the speaker or receiver. Unfortunately, adding these features to a hearing aid can increase hearing aid size and cost. Therefore, it is desired to provide a hearing aid which is adapted to perform signal processing to improve hearing without sacrificing size or cost.

Thus, there is a need for a hearing aid design which increases customization options without reducing affordability, comfort, and without detracting from aesthetics or function.

SUMMARY

The above-mentioned problems and others not expressly discussed herein are addressed by the present subject matter and will be understood by reading and studying this specification.

The present subject matter includes a method and apparatus for a modular hearing aid for a user having a hearing canal, including a housing adapted to fit within at least a portion of the hearing canal, and having at least one access port, a cover adapted for at least partially covering the at least one access port, and signal processing electronics connected to a microphone and a power supply. In various embodiments, a microphone housing is adapted to mount to the housing and to fit within the at least one access port, and to connect to the microphone, the signal processing electronics and the power supply. Further, the apparatus includes a receiver connected to the signal processing electronics, and a fastener as a unitary connector of the cover and microphone housing to the housing.

The present subject matter also includes a method of assembling a hearing apparatus for a user having a hearing canal. The method includes making a housing shaped for use at least partially inside the hearing canal, the housing including an access port and an opening. The method also includes assembling a microphone, a receiver, and signal processing electronics to a microphone housing. Additionally, the method includes inserting the microphone housing, microphone, receiver, and signal processing electronics into the housing through the access port. In various embodiments, the method also includes placing a cover to at least partially close the access port, and it further includes, in some embodiments, using a fastener as a unitary connector of the cover and the microphone housing to the housing.

The presently described subject matter also includes a hearing apparatus for a user having a hearing canal which includes a housing adapted to fit within at least a portion of the hearing canal, the housing having at least one access port and a mount for a pin. The apparatus also includes a cover adapted for at least partially covering the at least one access port, and including a mount for a pin. Additionally, the apparatus includes signal processing electronics connected to a microphone and a power supply, the signal processing electronics adapted to fit within the at least one access port. In various embodiments, the apparatus includes a microphone housing, adapted to mount to the housing and the access port, the microphone housing connected to the microphone, the signal processing electronics and the power supply, and including a mount for a pin. Various embodiments also include a receiver connected to the signal processing electronics, and a hinge pin as a unitary connector of the housing mount, the cover mount, and the microphone housing mount.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

BRIEF DESCRIPTION OF THE DRAWINGS

Various embodiments are illustrated by way of example and not by way of limitation in the figures of the accompanying drawings in which like references indicate similar elements.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. It will be apparent, however, to one skilled in the art that the various embodiments may be practiced without some of these specific details. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1:
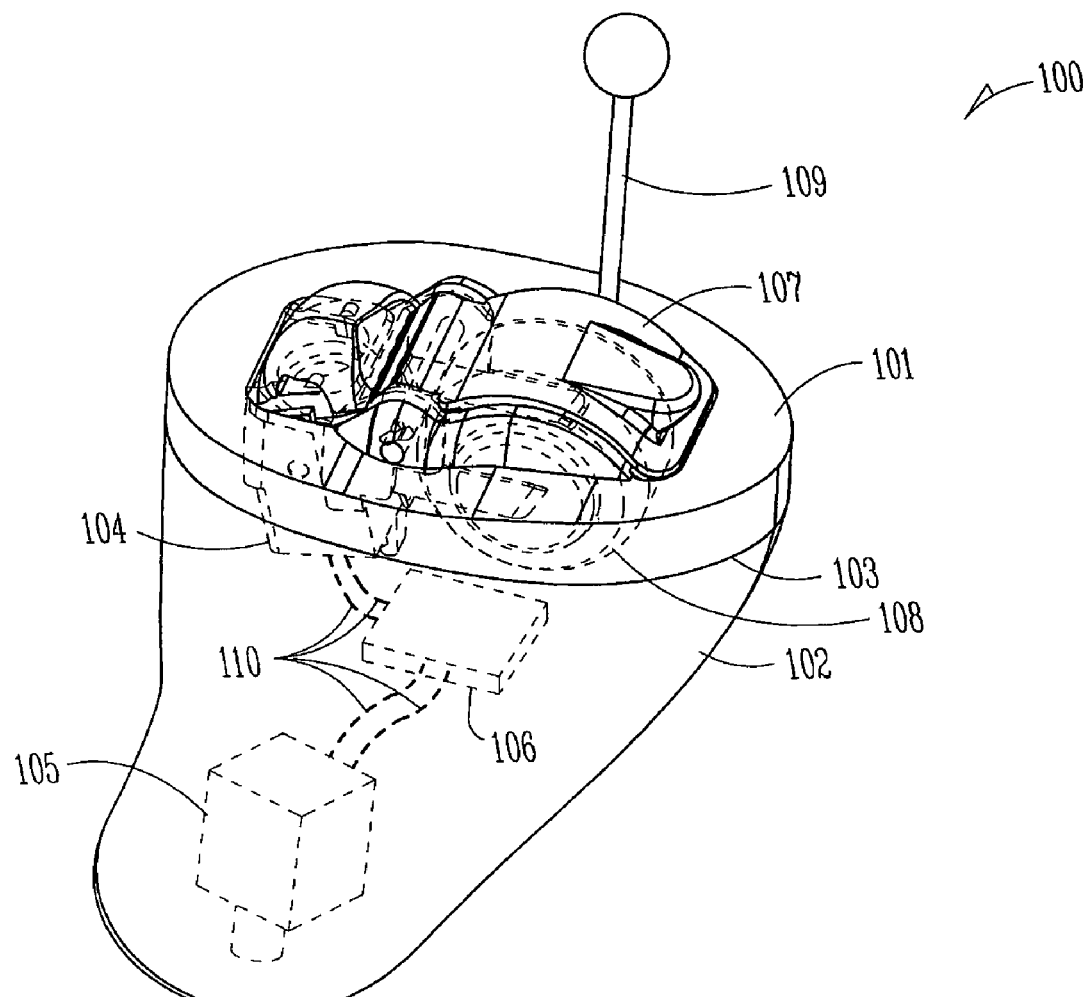
FIG. 1 illustrates a hearing aid according to one embodiment of the present subject matter.

FIG. 1 illustrates a hearing aid 100 according to one embodiment of the present subject matter. In various embodiments, the hearing aid 100 includes a shell 102 of an irregular conical shape, and a faceplate 101. In various hearing aid designs, to improve performance of the hearing aid, it is beneficial to customize portions of the hearing aid to the hearing aid user. For example, some hearing aid designs benefit from a reduced potential for a feedback loop to form between the hearing aid microphone housing 104 and the hearing aid receiver assembly 105. Therefore, in some designs, the shell is customized to sealingly mate with the individual user's hearing canal. However, it should be understood that the present subject matter also includes standardized shells which are suitable for mating to an hearing canal.

In various embodiments, the shell 102 includes a large opening adapted for interfacing with a faceplate 101. In various embodiments, this opening is irregular, requiring that the mating faceplate 101 be customized to fit to it. In various embodiments, a standard faceplate 201, as pictured in FIG. 2, which is larger than the opening, is fitted to the shell, and then modified to a custom shape. In various embodiments, fitting the faceplate to the shell involves using an adhesive at the interface 103 between the oversized faceplate 201 and the shell 102. In one example, the adhesive is cyanoacrylate. In various examples, the faceplate is then trimmed to blend with the contour of the shell. In one embodiment, the faceplate is trimmed with a routing operation. A hearing aid 100 demonstrating a fitted faceplate 101 is, in one embodiment, suitable for containing various hearing aid components, such as a receiver assembly 105, a signal processor 106, a microphone housing 104, a cover 107 and battery 108.

In various embodiments, additional hearing aid components may be included in the assembly. In one example, a telecoil is included in the assembly. Another example include a wireless transceiver adapted for wireless communications with a hearing aid programmer, or another hearing aid. Various embodiments can include combinations of these devices. Further, in various embodiments, hearing aid components are interconnected with conductors 110. In other embodiments, at least a portion of the conductors needed to interconnect hearing aid components are attached to a flexible substrate. In some embodiments, the hearing aid components are soldered to flexible printed circuitry ("FPC"). Embodiments using FPC can reduce assembly work by enabling a robot to attach components to the FPC. In such embodiments, final hearing aid assembly requires mating the FPC assembly to the housing, and does not require placement of individual hearing aid components within the housing.

By utilizing a design featuring a shell and a faceplate, it is possible to utilize a custom shell 102, and a standard faceplate 201, the faceplate adapted to utilize common parts, and further adapted to be customizable to the shell. In various embodiments, the common parts suitable for interface with faceplate 101 include a microphone housing 104, an insertion removal handle 109, a cover 107, and a battery 108. In further embodiments, a faceplate 101 is adapted to utilize various controls, such as adjusting dials and push-button switches.

Thus, the hearing aid improves user comfort due to its customized shape, and is less expensive due to increased use of standard parts.

Figure 2:
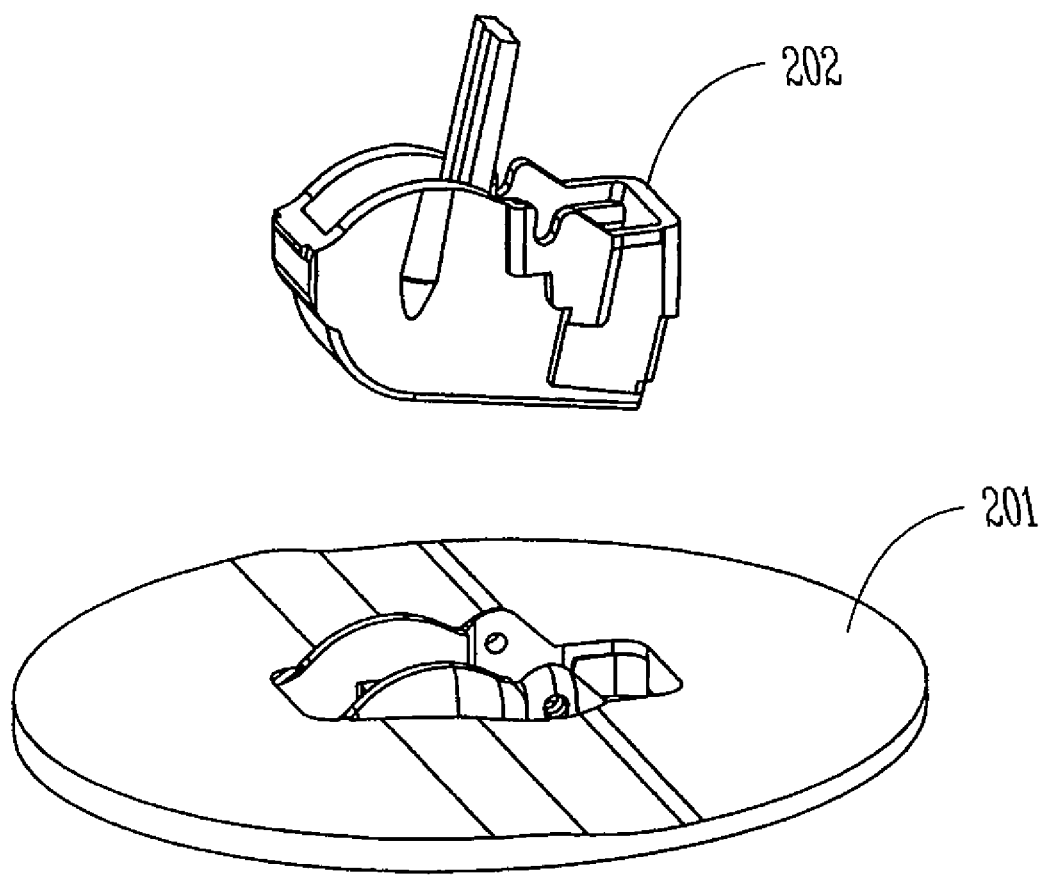
FIG. 2 illustrates a faceplate which has not been mounted to a shell, in one embodiment of the present subject matter.

FIG. 2 illustrates a faceplate 201 which has not been mounted to a shell. The illustration demonstrates one embodiment of the form of the faceplate before it is customized to match an opening in a shell. In various embodiments, the faceplate is attached to the shell, using glue or another method to sealingly fix the faceplate 201 to the shell. In further embodiments, the attachment of the faceplate 201 is assisted by using a planning module 202, which is detachably connected to the faceplate. In various embodiments, when attached to the faceplate 201, the planning module 202 assists in manipulation of the parts. In further embodiments, the planning module 202 is used after the faceplate is assembled to the hearing aid 100 (pictured in FIG. 1) to assist in manipulation of the hearing aid 100 during other operations, such as assembly and testing.

Figure 3:
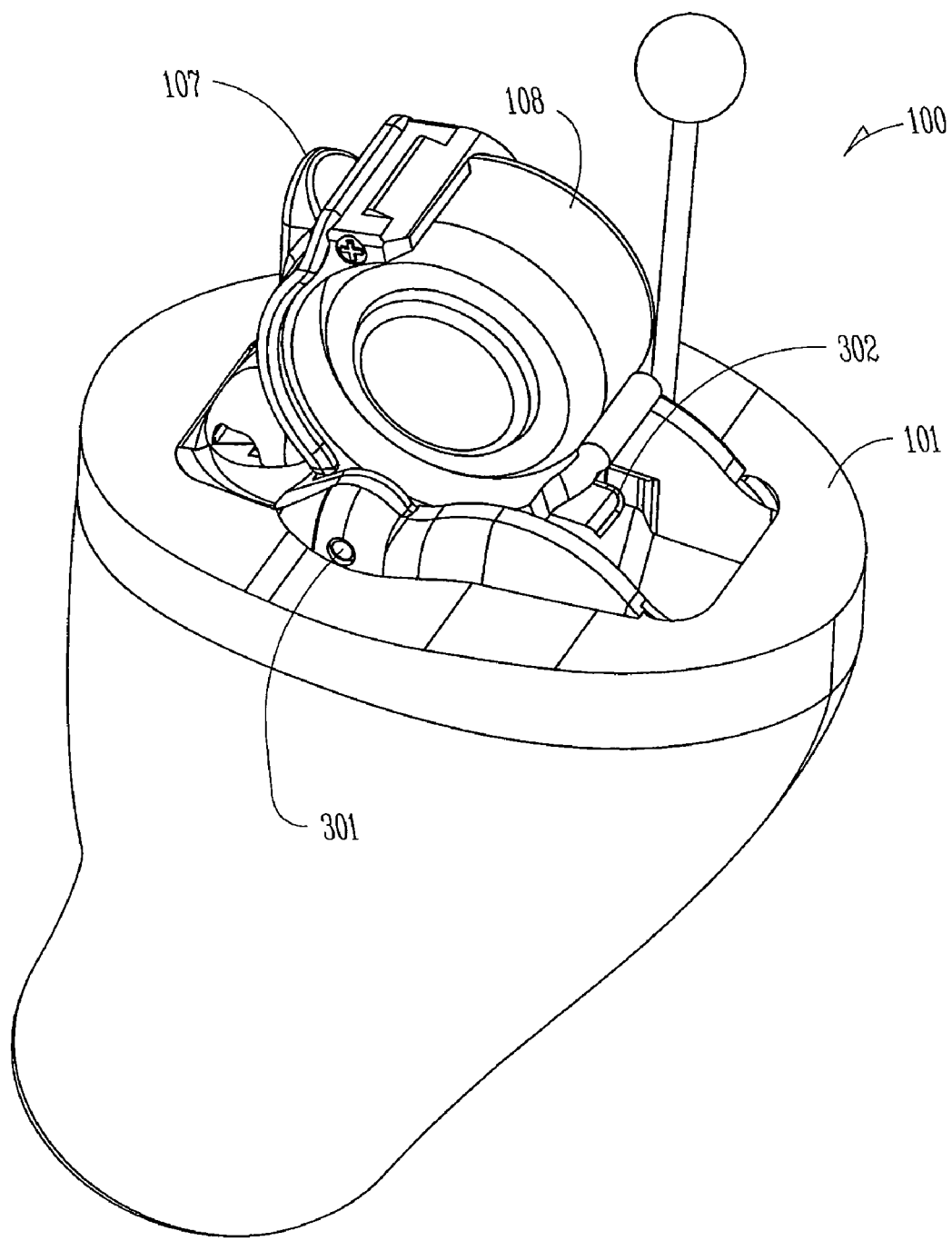
FIG. 3 illustrates a hearing aid using a cover, and shows the cover in an open position, in one embodiment of the present subject matter.

FIG. 3 illustrates a hearing aid 100 using a cover 107, and shows the cover 107 in an open position. In various embodiments, opening the cover 107 allows access to the battery 108. In some examples, opening the cover 107 allows access to the components inside the hearing aid. Various embodiments allow the cover 107 to be completely removed from the hearing aid 100. In various embodiments, the hearing aid 100 is equipped with a fastener 301. In some examples, the cover 107 is adapted to rotate around the fastener 301. For example, the cover 107 can have a port through which a fastener, in embodiments where the fastener is shaped like a pin, is inserted. In such embodiments, separating the cover 107 from the hearing aid 100 is not possible unless the fastener 301 is removed from the hearing aid 100. In other embodiments, the cover 107 can be equipped to clip to the fastener 301. In such embodiments, the cover 107 can be added to or separated from the faceplate 101 without removing the fastener 301.

In various embodiments, a method of opening the cover 107 allows access to the battery 108, so that the battery can be removed or replaced when discharged. However, in further embodiments, the cover can also function as a power switch. In various embodiments, opening the cover 107 disconnects the battery 108 from internal components, and consequently, power. In one example, opening the cover 107 disconnects the battery 108 from battery terminals 302.

Figure 4A:
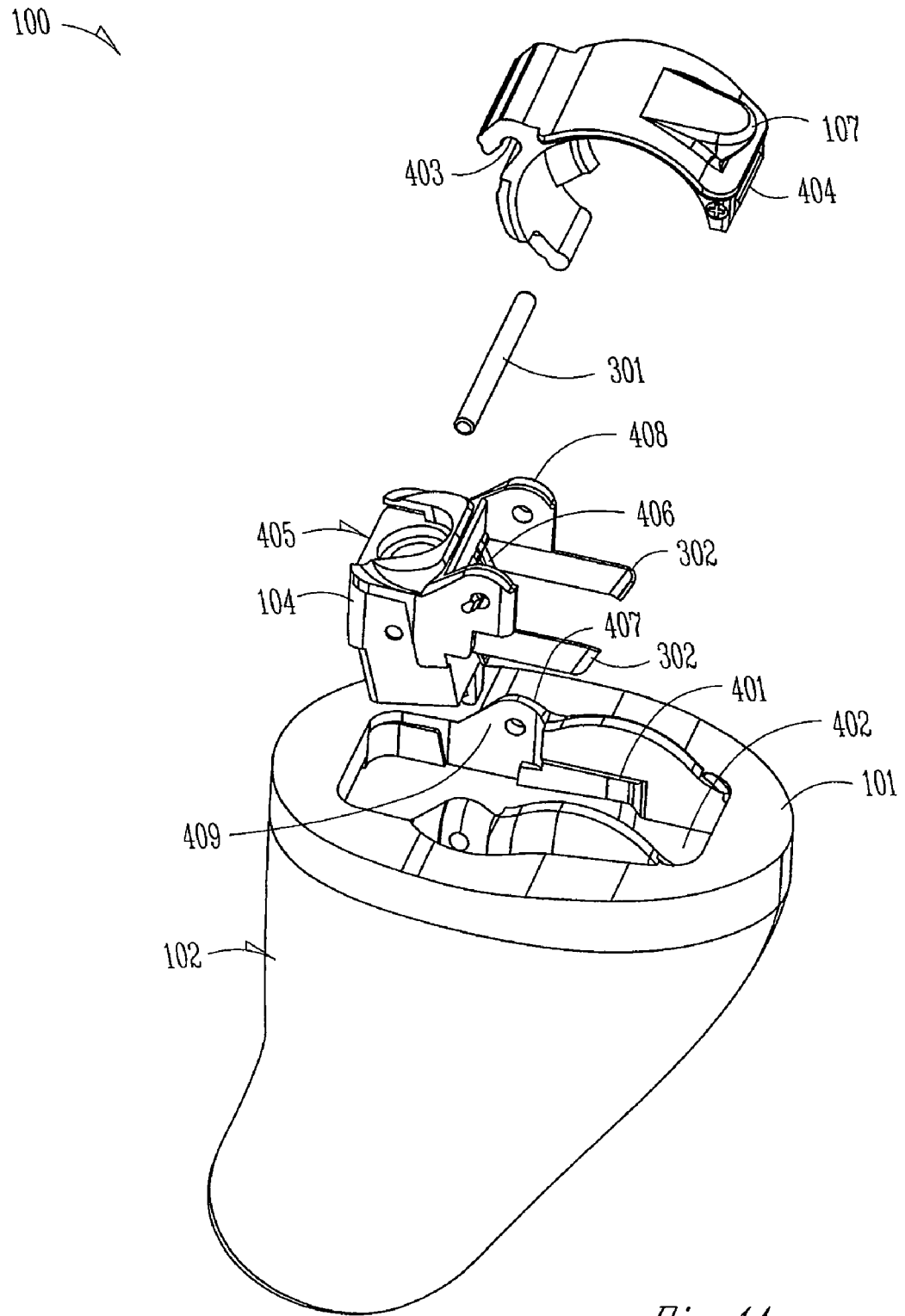
FIG. 4A illustrates an exploded view of a hearing aid shell, a faceplate, a microphone housing, a cover, and a fastener, in one embodiment of the present subject matter.

FIG. 4A illustrates an exploded view of a hearing aid shell 102, a faceplate 101, a microphone housing 104, a cover 107, and a fastener 301. In various embodiments, the faceplate 101 includes an access port 402 adapted to interface and seat the microphone housing 104. For example, when the microphone housing 104 is inserted into the access port 402, and the fastener 301 is inserted through the housing mounts 407 and the microphone housing mounts 408, the microphone housing 104 is constrained and movement is substantially restricted.

In one example, the access port includes an interface 409 which is designed to receive the microphone housing 104 at an orientation approximately perpendicular to the plane formed by the interface of the shell 102 and the faceplate 101, or an equivalent plane. However, in some embodiments, the interface 409 is adapted to receive the microphone housing at various orientations which are skew to the line approximately perpendicular to said plane or its equivalent, in the interest of robustness in manufacturing assembly. It should be noted, however, that once the fastener 301 is inserted, the microphone housing is substantially constrained.

In various embodiments, the cover 107 is adapted to clip to the fastener 301. In some examples, the fastener 301 is pin shaped. In further embodiments, the cover 107 includes a cover mount 403. In various embodiments, the cover mount is a C-shaped channel which has an interior diameter which is approximately equal to the diameter of the pin. In one example, the curvature of the C-shaped channel 403 forms an arc extending over 180 degrees around the center axis of the C-shaped channel 403. In this example, the plastic of the cover which forms the C-shaped channel 403 must elastically deform when the cover is clipped into place. Additionally, in such examples, the plastic of the C-shaped channel 403 must elastically deform when the cover is separated from the fastener 301. In embodiments using a C-shaped channel 403, the cover 107 is removable from the hearing aid 100 without removing the fastener 301. In further embodiments not pictured, the cover does not clip to the fastener 301, but is mounted using a port through which the fastener 301 must pass. One benefit of a clip design is reduced complexity of plastic injection molding tooling, and an ability to remove the door without fastener disassembly. One advantage to a port design is that the cover is attached to the fastener and can better endure an increased range of forces without disassembly.

In embodiments using a pin shaped fastener, after the cover 107 is installed, it is free to revolve around the fastener 301. In some embodiments, rotating the cover 107 toward a seated position engages a locking feature 404. In various embodiments, closing the cover requires the locking feature 404, the cover 107, or a combination of both, to deform elastically while the cover 107 undergoes a seating process which results in the cover being substantially constrained, an example of which being pictured in FIG. 1. In various examples, when the cover 107 is seated, the forces causing elastic deformation are relieved, due to the locking feature 404 mating to a relief in the interface 409. In this position, the cover 107 is substantially constrained. In such embodiments, to remove the cover 107 from a seated position requires forces sufficient to again deform the interfacing components in a manner sufficient to disengage the locking feature 404 from the mating relief.

In some embodiments, the cover 107 is adapted to accept a battery, not pictured, in a manner which fixes the orientation of the battery. In various embodiments, fixing the orientation of the battery enables the cover 107, when seated, to position the battery such that the poles of the battery are located in a desired position in regards to hearing aid components, such as terminals 302. In various embodiments, the microphone housing 104 includes battery terminals 302 designed to form positive and negative connections to an button battery assembled to the closed cover. In one embodiment, the faceplate 101 is molded with reliefs 401. One advantage to allowing the battery terminals 302 to deform into a relief 401 is that the gap between the faceplate and the cover can be reduced while maintaining an inexpensive springing battery terminal design. In various designs, if there were no relief, the cover would have to extend beyond the envelope of the button battery to cover the area consumed by the battery terminals 302.

In various embodiments, one aspect of the microphone housing 104 design which improves ease of assembly is the placement of solder pads, not pictured, at the back surface 405 of the microphone housing 104. Because programming tabs 406 require a high dimensional stability to reliably interface with a programming connector, discussed below, it is important that the plastic proximate to the programming tabs, which holds the programming tabs 406 in place, not be permanently deformed, which can occur in some instances due to a soldering process. Placing solder pads, used to connect the microphone housing to other hearing aid components, on the back surface 405 of the microphone housing 104 relieves the need to depend on precision soldering to avoid deformation of the plastic structure supporting the programming tabs 406. Moving the solder pads to the back surface 405 of the microphone housing 104 allows the assembly process to tolerate variance in the soldering process, both dimensionally and thermally. This robust design decreases manufacturing defects.

Figure 4B:
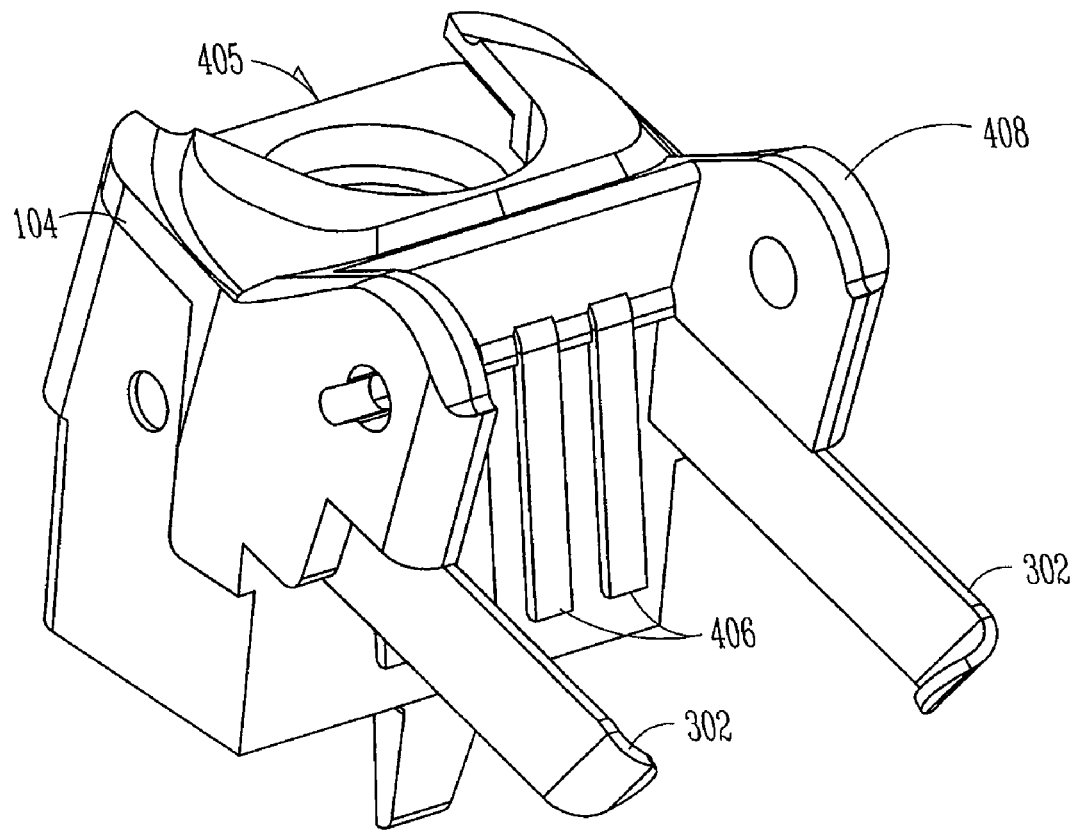
FIG. 4B illustrates an close view of a microphone housing, a cover, and a fastener, in one embodiment of the present subject matter.

FIG. 4B illustrates, in various embodiments, a cut-away close-up view of microphone housing 104, programming tabs 406, battery terminals 302, housing mounts 408, and back surface 405.

Figure 5A:
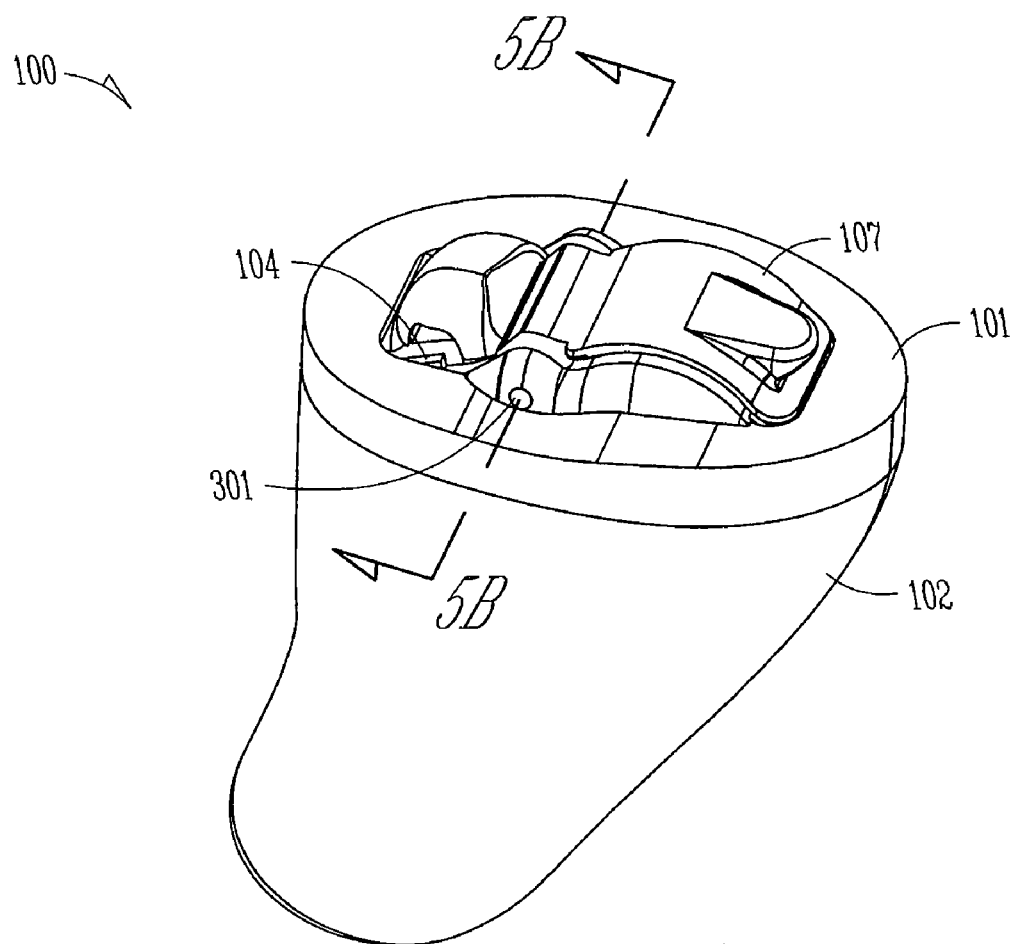
FIGS. 5A-5B illustrate a hearing aid according to the present subject matter, in one embodiment of the present subject matter.
Figure 5B:
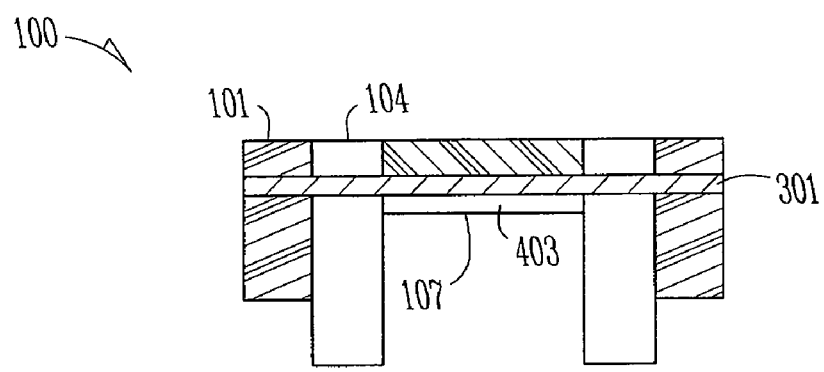

FIGS. 5A-5B illustrate one embodiment of a hearing aid 100 according to the present subject matter. FIG. 5A shows a hearing aid shell 102 and a faceplate 101, in which a microphone housing 104 and a cover 107 are installed. The figure also demonstrates a plane A which is used in part to create the cross section picture of FIG. 5B. FIG. 5B illustrates a partial view of the cross section taken by like 5B-5B. FIG. 5B includes various parts in cross section, and fastener 301 in an elevated view, for clarity. In this view, it is apparent that in various embodiments, the cover utilizes a C-shaped channel 403, which is not cut by plane A. In other embodiments, plane A cuts the C-shaped channel 403, and in further embodiments, the cover 107 includes a port, not pictured, which is cut by plane A. The illustration also demonstrates one embodiment of a manner in which the cover 107, faceplate 101, microphone housing 104, and fastener 301 are assembled together.

It should be noted that the concepts enumerated in the figure are not limited to embodiments which utilize both a shell and a faceplate, but extend to other housing variations.

For example, in one embodiment, a one piece housing with an access port constrains a microphone housing and cover using a fastener.

Figure 6A:
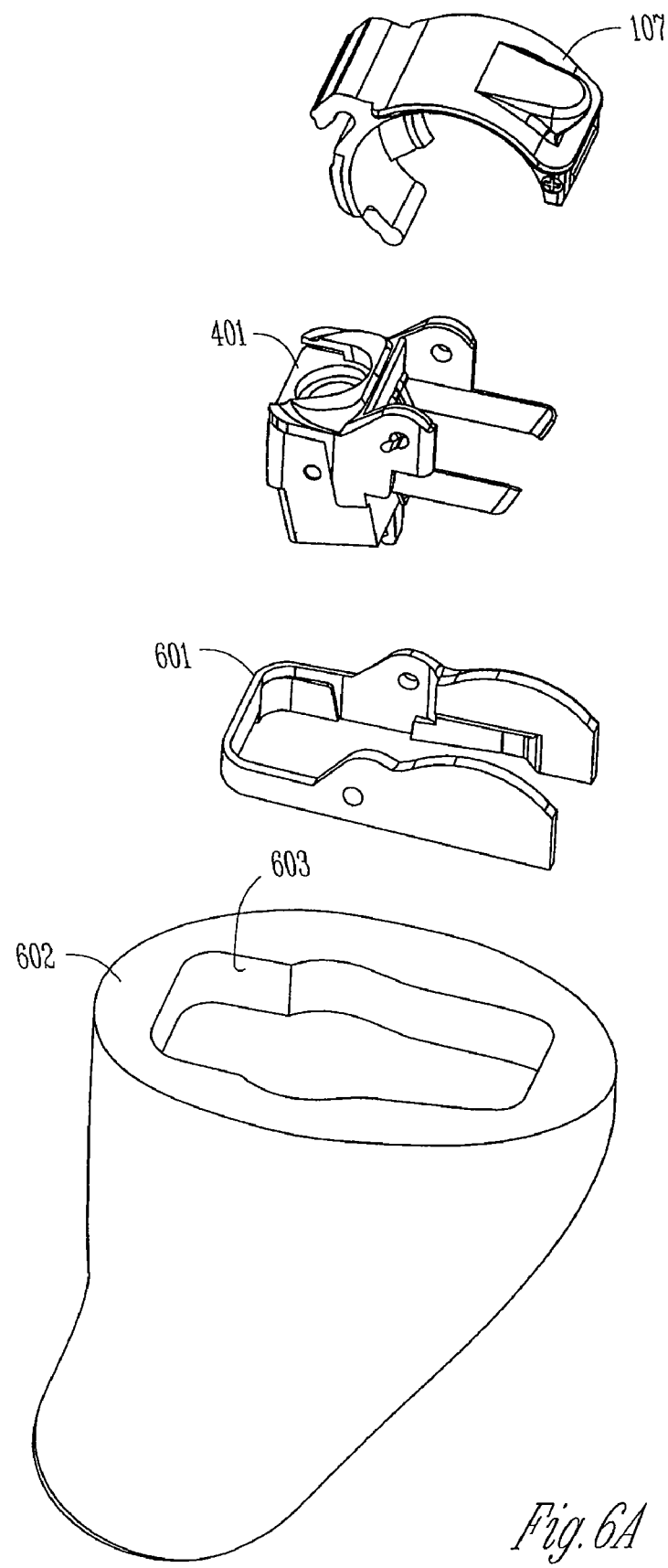
FIG. 6A illustrates a hearing aid which does not use a faceplate, in one embodiment of the present subject matter.

FIG. 6A illustrates one embodiment of a hearing aid which does not use a faceplate. In various embodiments, the hearing aid includes a housing 602, which is a single, seamless piece. In one example, the housing is made using a stereolithography ("SLA") process. Making a hearing aid out of a one piece housing, instead of two pieces, such as a shell and a faceplate, removes the need for a faceplate, and the costs associated with fitting a faceplate to a shell. In some embodiments, a housing is formed when features adapted for receiving a fastener, and an access port, are created in the housing as part of the SLA process. In other embodiments, the housing is formed when the housing 602 is sealingly combined with a bezel 601. In various embodiments, the bezel 601 is glued into the housing 602. Once glued into place, the bezel 601 forms an access port with an interface suitable for receiving a microphone housing 401 and a cover 107. It should be noted that in various examples, the bezel 601 can be assembled to other components before it is assembled to the housing 602.

Various examples of the bezel 601 utilize a material which has superior mechanical properties when compared to the material from which the housing 602 is made. Further examples utilize a bezel 601 which has improved dimensional accuracy when compared to the process used to make the housing 602. In various examples, the bezel 601 is a molded polymer.

Figure 6B:
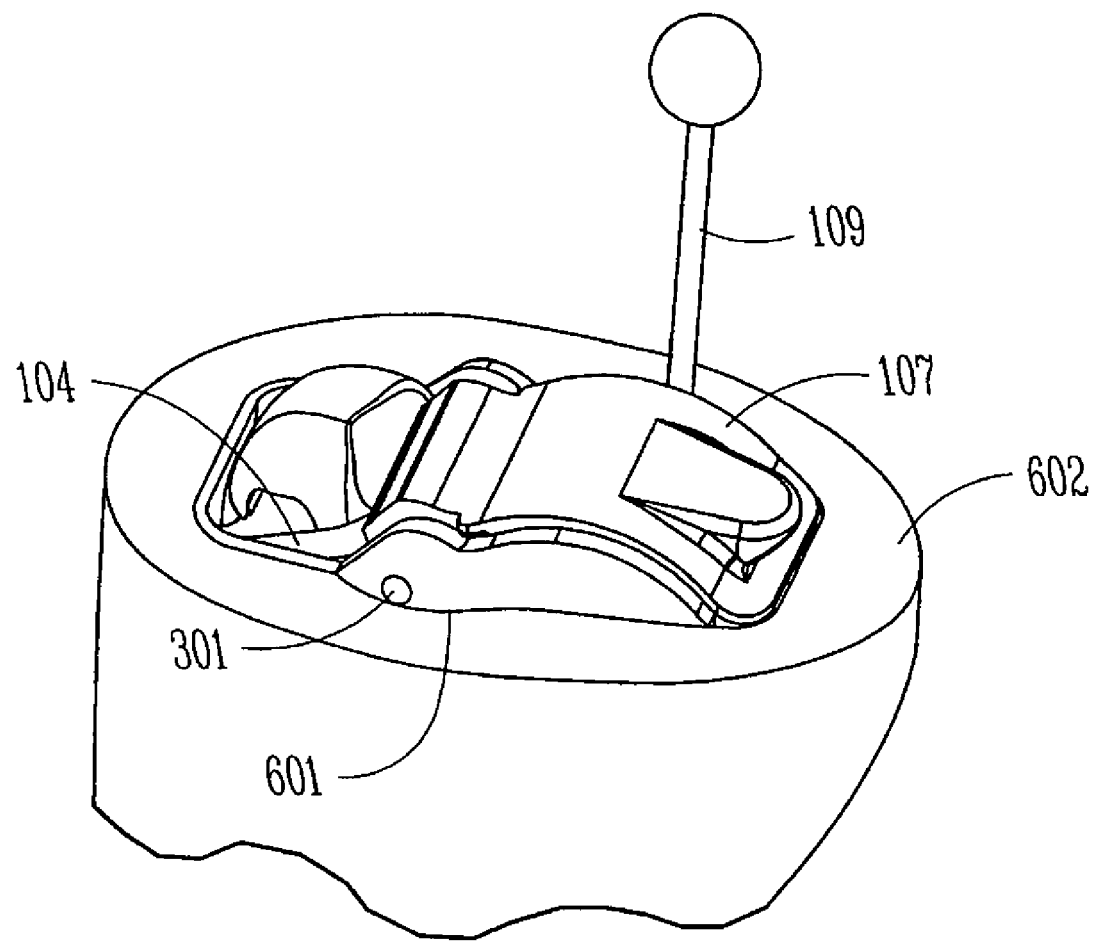
FIG. 6B illustrates an at least partially assembled hearing aid made from a housing and a bezel, and not a faceplate, in one embodiment of the present subject matter.

FIG. 6B illustrates one embodiments of an at least partially assembled hearing aid made from a housing 602 and a bezel 601, and not a faceplate. In various embodiments, the hearing aid is composed of a housing 602, a microphone housing 104, a cover 107, and a fastener 301. Additionally, in various embodiments, the hearing aid includes an insertion removal handle 109.

Figure 7A:
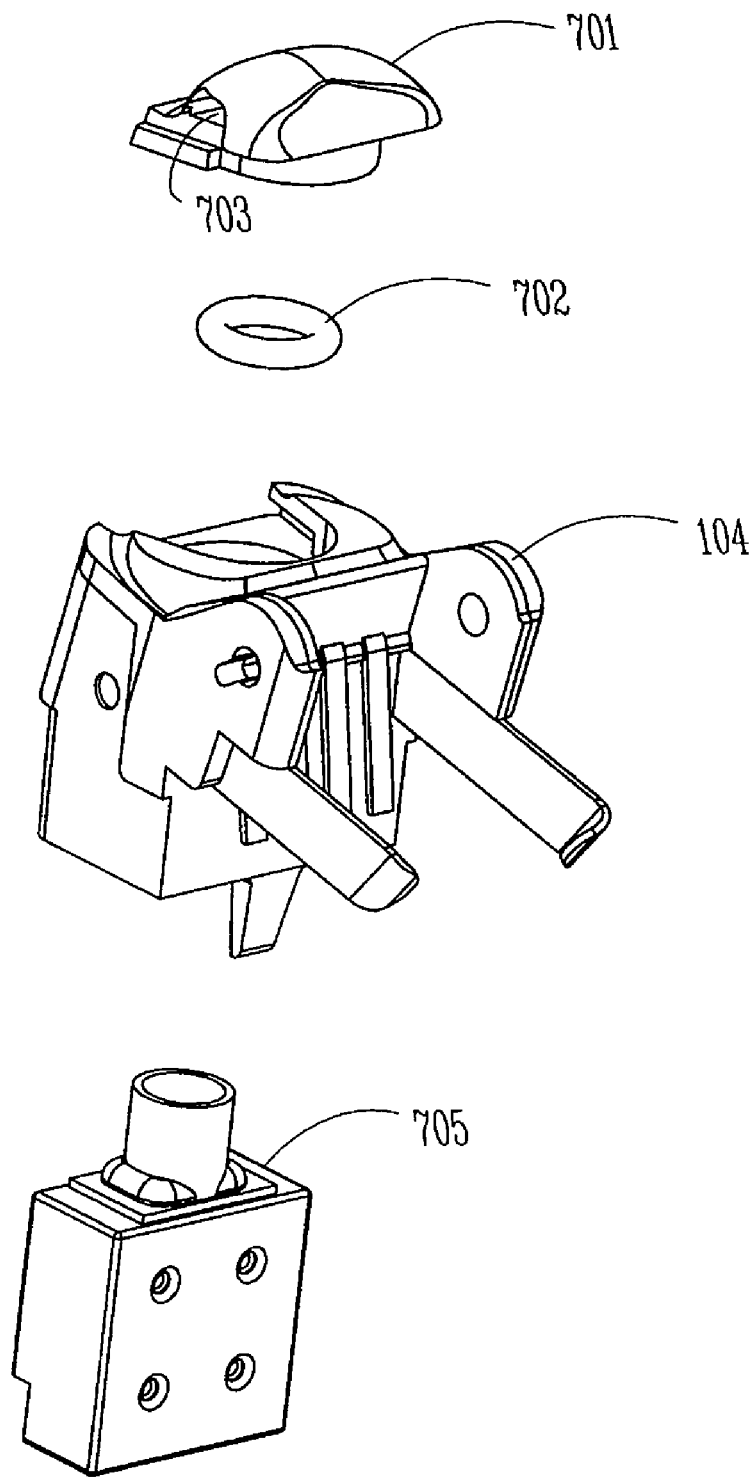
FIG. 7A illustrates a microphone housing for use in a hearing aid, in one embodiment of the present subject matter.

FIG. 7A illustrates one embodiment of a microphone housing 104 for use in a hearing aid. In various embodiments, the microphone housing 104 is adapted to detachably receive a microphone hood 701. In various embodiments, the microphone hood 701 includes features which enable it to snap or lock to a microphone housing 104. In further embodiments, the microphone hood 701 does not snap or lock to the microphone housing 104, but instead slides into a socket in the microphone housing 104, and is constrained from detachment after the microphone housing 104 is installed in the hearing aid. In various embodiments, the microphone hood 701 is removable while the microphone housing 104 is installed in the hearing aid.

Some embodiments of the present subject matter include a microphone box 705 which is sized for placement in the microphone housing 104. In various embodiments the microphone housing includes terminals, not pictured, which mechanically connect the microphone box 705 to circuitry in the microphone housing. In some embodiments, the microphone housing 104 is sized so that the microphone box 705 snaps into place, and in others, the microphone box 705 is not constrained until the microphone housing is mated to a hearing aid access port interface.

In various embodiments, the microphone hood 701 seals to the microphone housing 104. One benefit of this seal is to reduce the availability of noise paths between the sound ports 703 and the microphone box 705. A further benefit is that the seal discourages movement of the microphone hood 701 in relation to the microphone housing 104. A further benefit is to reduce the instance of rattling between the microphone hood 701 and the microphone housing 104. In some embodiments, an o-ring 702 is used to seal the microphone hood to the microphone housing. An o-ring seal can be formed of various types, including a face seal, a radial seal, a dovetail seal, a half-dovetail seal, a boss seal, or a crush seal. In other embodiments, another type of seal is used. An additional benefit of the microphone hood 701 is that it protects the microphone housing 104 from being damaged.

Figure 7B:
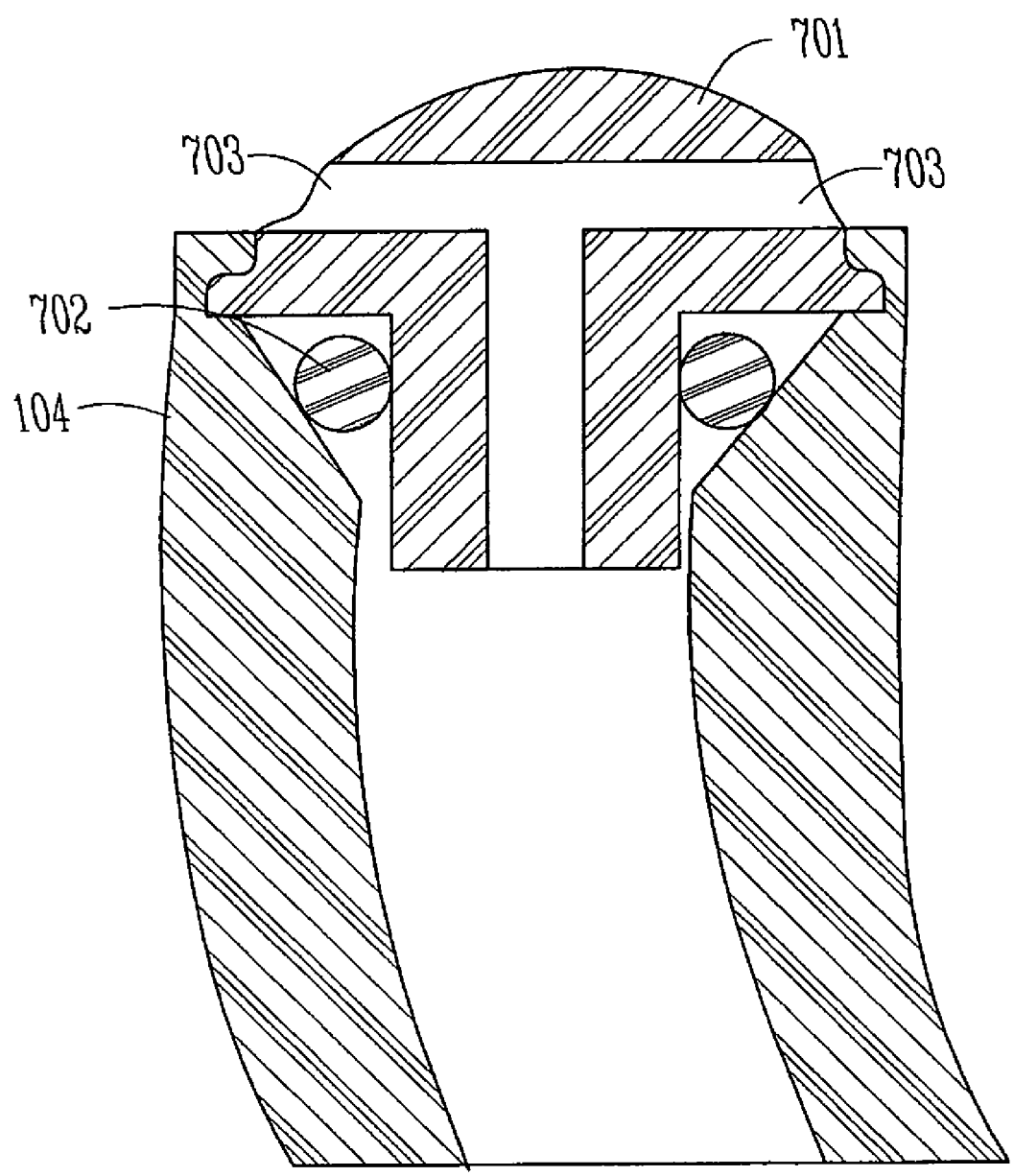
FIG. 7B illustrates a microphone hood installed to a microphone housing, in one embodiment of the present subject matter.

FIG. 7B. illustrates one embodiment of a microphone hood 701 installed to a microphone housing 104. The illustration shows a cross section of various parts for clarity. In various embodiments, the microphone hood 701 protrudes from the surface of the microphone housing 104. In one example, two sound ports 703 are included in the microphone hood 701. In various embodiments, sound ports 703 are adapted for passage of a cleaning element. For example, an elongated paper clip could pass through them in some embodiments. The availability of an inexpensive cleaning element to clear debris, such as ear wax, is a benefit to the user. In various embodiments, a microphone box, not pictured, is installed in the microphone housing 104 such that the microphone box is sealingly connected to the microphone housing 104. An o-ring 702 is part of this sealing system in some embodiments. In various examples, sound must travel through the ports 703, and into the microphone box, in order to affect the hearing aid sound processing electronics.

It is to be understood that a removable microphone hood is not limited to embodiments which utilize a microphone housing. In various additional embodiments, a microphone hood is adapted to mate directly to any type of housing, including one formed of a single, seamless piece. In such embodiments, the microphone hood is adapted to lock or snap to the housing so that it is removable only upon a directed effort to remove, and otherwise remains in place during use. A directed effort to remove a microphone hood, in one embodiment, is achieved by an average user pressing the hood with their thumb in an attempt and move it out of a locked position.

Among the benefits of the microphone hood of the present subject matter are ease of cleaning, and ease of replacing the hood. A hood which is easy to replace accommodates damage, aesthetic customization, and variations in sound port location. Additionally, a microphone hood socket could connect to other devices. Because the hood can be changed without modifying the hearing aid, changing the hood to accommodate these improvements is inexpensive.

Figure 8:
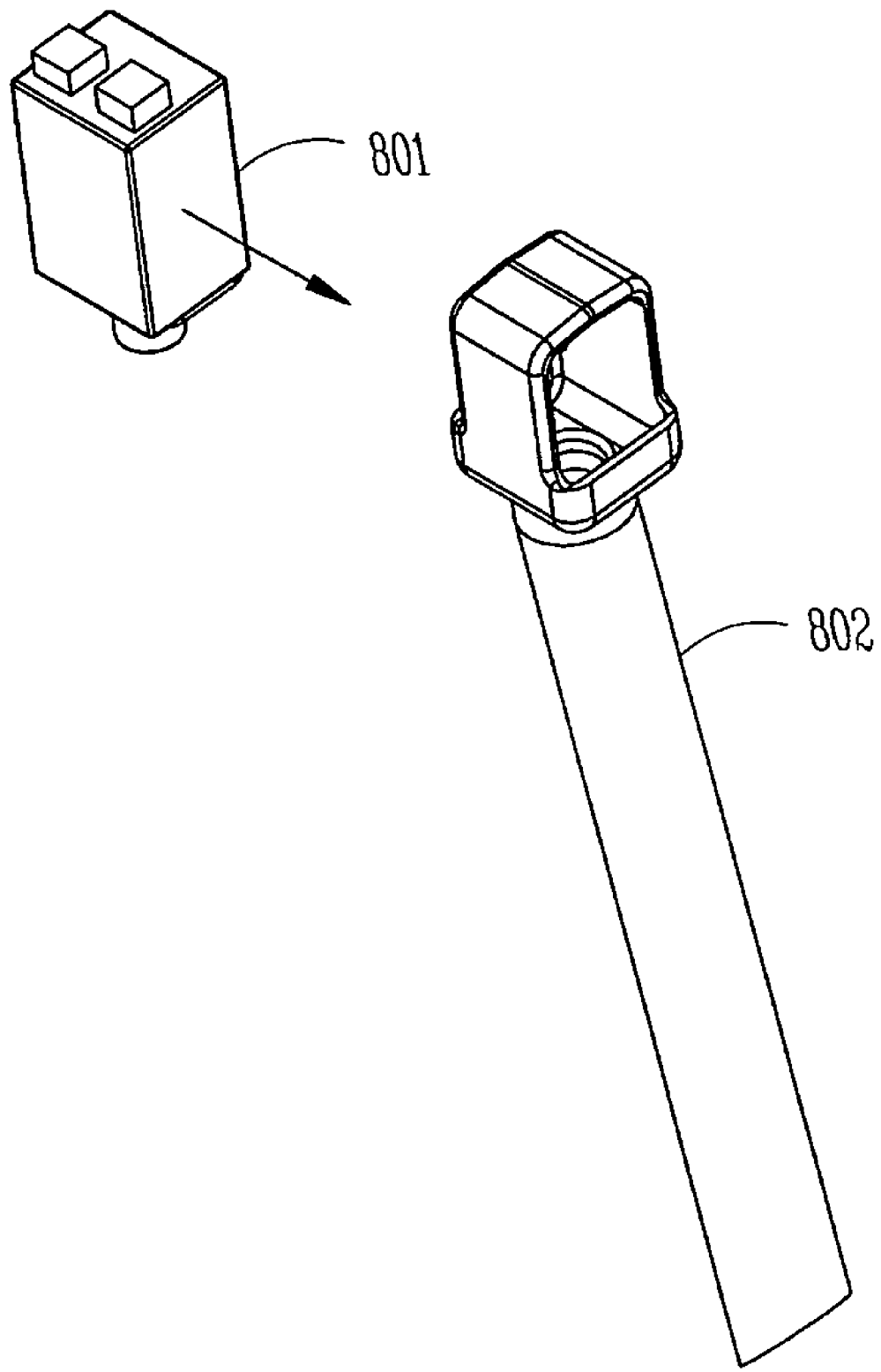
FIG. 8 illustrates the receiver assembly, in one embodiment of the present subject matter.

FIG. 8 illustrates one embodiment of the receiver assembly, according to the present subject matter. In one embodiment, the receiver assembly includes a flexible receiver tube 802, and a receiver box 801. One example of a receiver box 801 includes a speaker which ultimately transmits sound to the user. Some examples of the present subject matter include the flexible receiver tube 802 assembled to the receiver box 801, comprising the receiver assembly 105 (pictured in FIG. 1).

In various embodiments, the receiver tube 802 is constructed from an elastic material. Various examples of the receiver tube 802 are formed such that they mate with a receiver box 801 when they are not stretched. In one example, the receiver tube 802 is stretched around the receiver box 801, and holds the receiver box in place, as the mating features formed into the receiver tube 802 discourage movement of the receiver box. In various embodiments, the receiver tube 802 exerts a constant pressure on the receiver box due to an elastic deformation induced by assembly of the two components.

One benefit of such a receiver tube design is that it is easy to assemble. In various embodiments, the receiver tube 802 does not require alignment with any housing features beyond placing the tube through an opening in the housing, not pictured, sized to receive the receiver tube. In such embodiments, the tube is free to be rotated or tilted while it is mated to the receiver tube opening. Such flexibility in alignment allows an assembly process to install a receiver assembly with reduced effort. In various embodiments, once the receiver assembly is inserted into the shell, the receiver tube is glued to the shell, portions of the receiver assembly are trimmed away. Some embodiments trim the receiver tube to match the contours of the housing.

Figure 9:
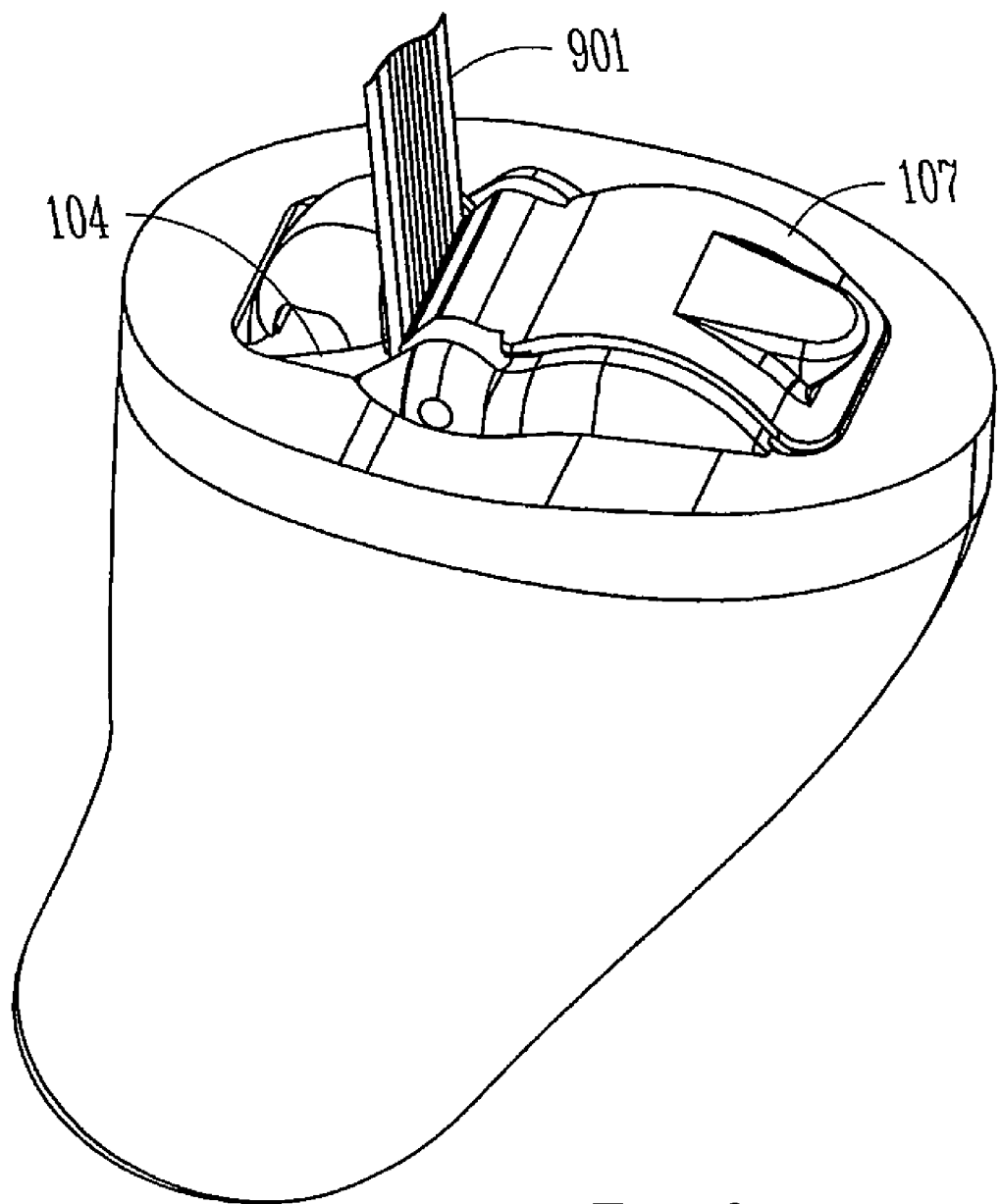
FIG. 9 illustrates a hearing aid programmer connected to a hearing aid, in one embodiment of the present subject matter.

FIG. 9 illustrates a hearing aid programmer connected to a hearing aid, in one embodiment of the present subject matter. In various embodiments, the cover 107 is suitable for interfacing with a programming connector 901. In one embodiment, a programming connector is inserted between the cover 107 and the microphone housing 104, such that terminals on the programming connector 901 interface with the programming terminals 406 of the microphone housing 104, pictured in FIG. 4. In one embodiment, the cover 107 is in a closed position, and allows the programming connector to interface with the hearing aid. Interfacing with the hearing aid while the cover is closed is possible because the programming connector 901 is shaped so that it fits in the opening between the closed cover and the microphone housing 104. In one embodiment, the programming connector 901 is a piece of flexible printed circuitry. In various embodiments, the programming connector 901 is removable without opening the cover 107.

Figure 10A:
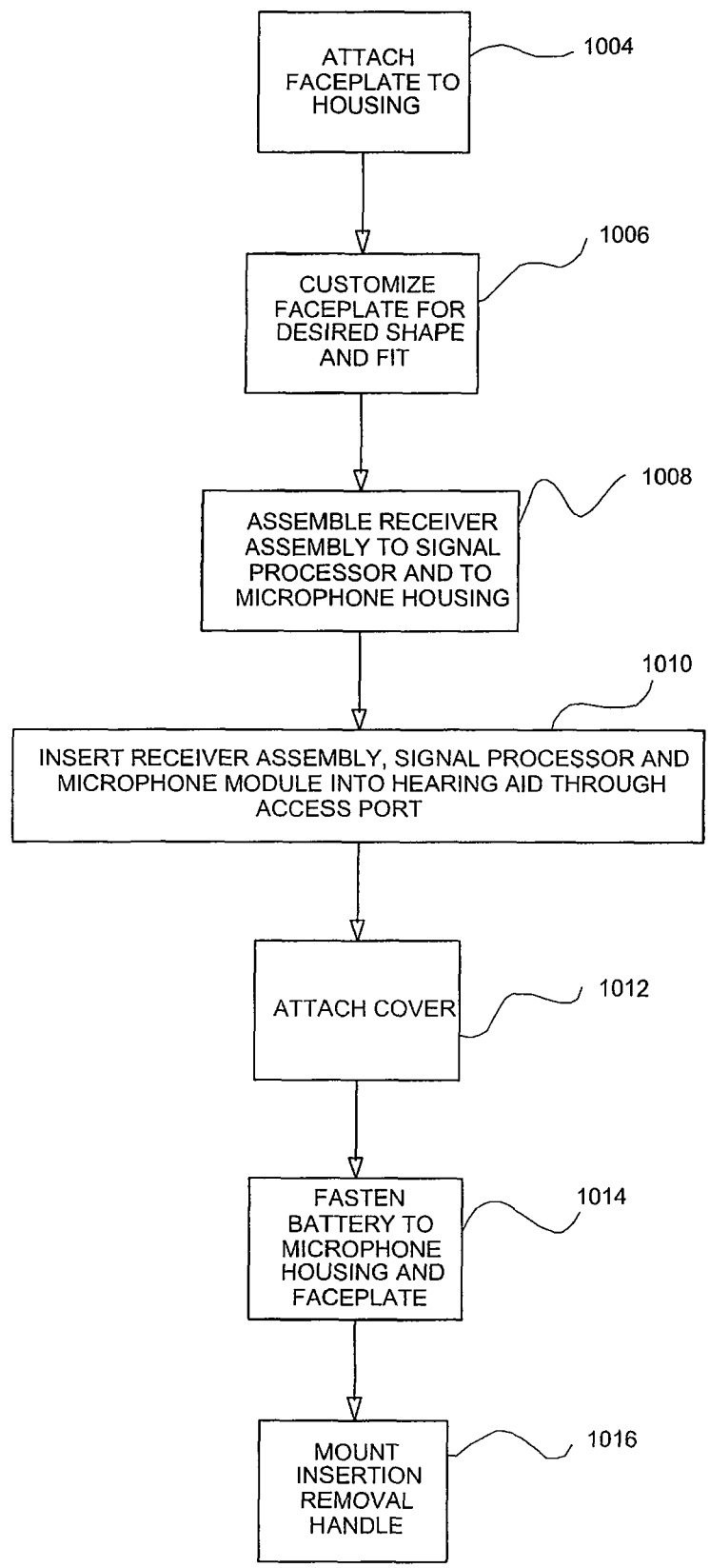
FIG. 10A illustrates one method of assembling a hearing aid from a faceplate combined with a shell, according to one embodiment of the present subject matter.

FIG. 10A illustrates one method of assembling a hearing aid from a faceplate combined with a shell, according to one embodiment of the present subject matter. In the embodiment illustrated, a faceplate is glued to a housing 1004. In one embodiment, the faceplate is oversized, and attached to the housing. The faceplate is then trimmed and blended to match the contour of the housing 1006. Various embodiments of the housing include an access port through which hearing aid components can pass, and an interface for a fastener.

In various embodiments, the access port includes an interface adapted to seat a microphone housing, and in additional embodiments, an access port interface adapted to seat a cover. In various embodiments, the signal processor and receiver assembly are attached to the microphone housing 1008. In these embodiments, the microphone housing receiver assembly and signal processor are inserted through the access port, and the microphone housing is seated in the microphone housing interface of the access ports 1010. In one embodiment, the receiver tube assembly is fed through a receiver tube opening in the housing, and in further embodiments is attached to the housing. Various embodiments trim the receiver tube assembly to fit the user, including trimming the receiver assembly to be flush with the housing.

Various embodiments seat the cover to the cover interface in the access port 1012. In various embodiments, the cover is fastened to the to the microphone housing and faceplate 1014. In some embodiments, the cover is seated to the faceplate, effectively closing the access port and sealing other components in the housing. Further, in various embodiments, a insertion removal handle is inserted into the faceplate and fixed into position 1016.

Figure 10B:
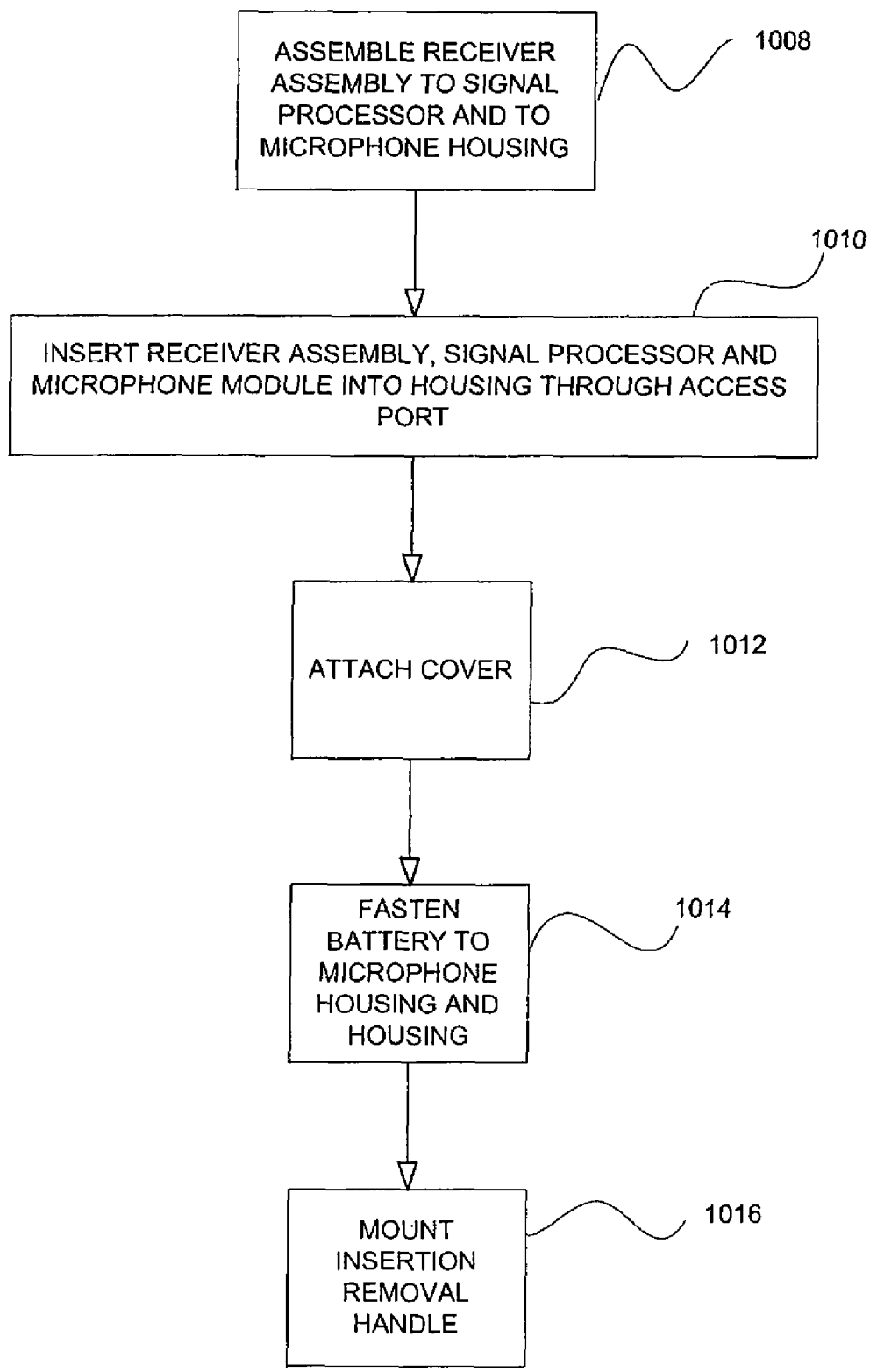
FIG. 10B illustrates one method of assembling a hearing aid from a single piece housing, according to one embodiment of the present subject matter.

FIG. 10B illustrates one method of assembling a hearing aid from a single piece housing, according to one embodiment of the present subject matter.

Figure 10C:
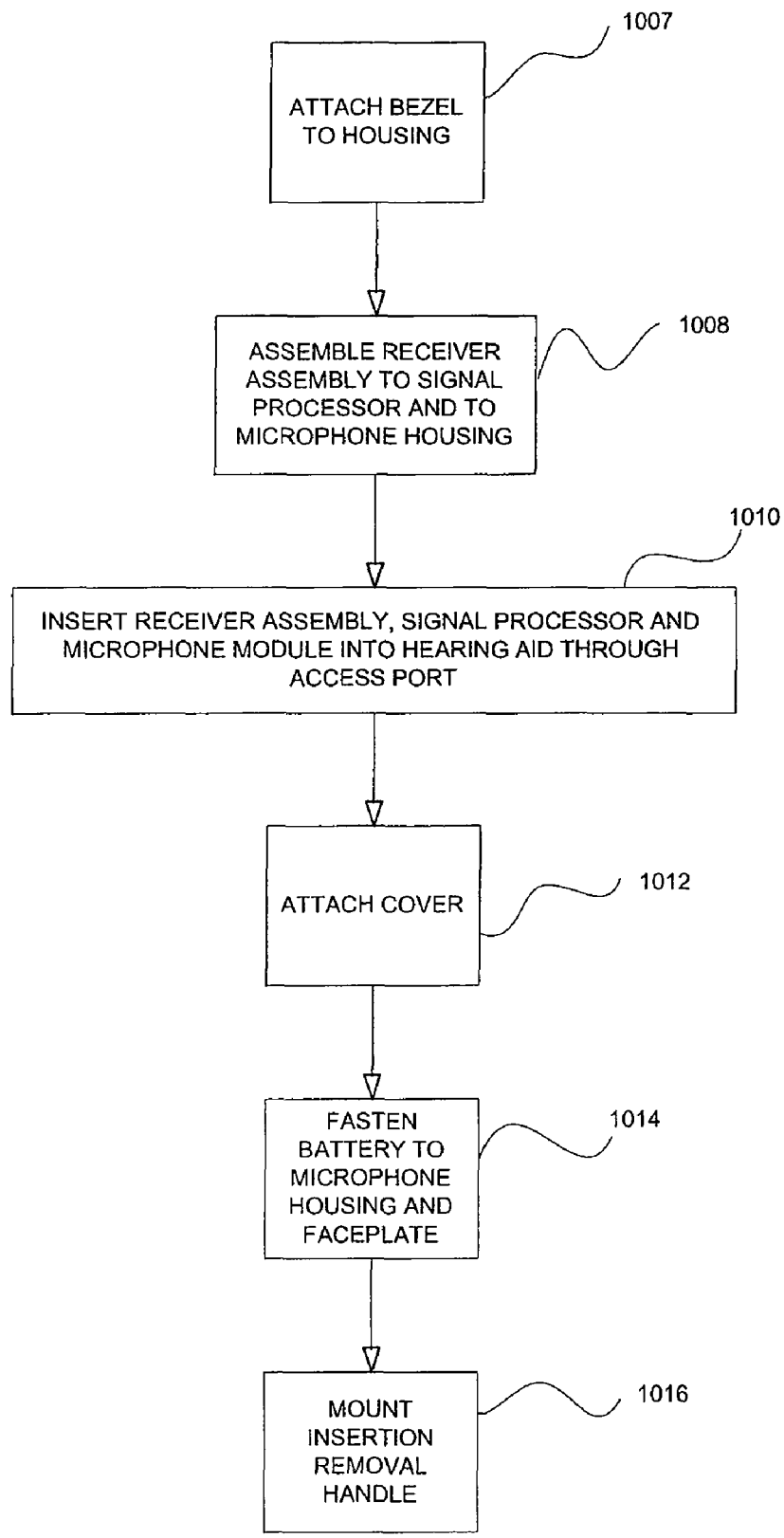
FIG. 10C illustrates one method of assembling a hearing aid from a housing combined with a bezel, according to one embodiment of the present subject matter.

FIG. 10C illustrates one method of assembling a hearing aid from a housing combined with a bezel, according to one embodiment of the present subject matter. In embodiments which combine a housing with a bezel, a bezel is glued into the housing 1007.

A hearing aid with a housing, a faceplate, an insertion removal handle, microphone housing, signal processor, receiver assembly, cover, and battery is suitable for use as a hearing aid. It should be noted that the scope of the present subject matter includes the processes described here, and additionally includes processes not enumerated here. As such, variations in the order of the elements is within the scope of the present subject matter. Additionally, variations in the content of the process do not escape the scope of the present subject matter. The process described here is useful to illustrate one method of constructing a modular hearing aid.

One benefit of embodiments described above is that fastener assembly allows a robust mount for the cover. A robust mount is better equipped to experience forces without failure. Another benefit is that the components are easy to assemble. A further benefit is that the microphone housing, constrained by its interface with the access port, and the fastener, does not require the added complexity of a snap-in design. Additionally, the ability to fasten the receiver tube to the housing, and then trim it, reduces the sensitivity of the components to orientation as they are assembled. For example, inserting the receiver assembly and the signal processor through the access port and into a particular orientation is difficult. The present subject matter does not require such orientation, and as such, reduces assembly difficulty, which reduces assembly costs.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

What is claimed is:

1. A method of assembling a hearing apparatus, for a user having a hearing canal, comprising:
    making a housing shaped for use at least partially inside the hearing canal, the housing including an access port and an opening;
    assembling a microphone, a receiver, and signal processing electronics to a microphone housing;
    inserting the microphone housing, microphone, receiver, and signal processing electronics into the housing through the access port;
    placing a cover to at least partially close the access port; and
    using a fastener as a unitary connector of the cover and the microphone housing to the housing.

2. The method of claim 1, including making the housing from sections.

3. The method of claim 2, wherein the making the housing comprises combining a shell and a faceplate.

4. The method of claim 3, wherein the combing the shell and the faceplate includes trimming the faceplate.

5. The method of claim 3, further comprising assembling a microphone hood to the faceplate.

6. The method of claim 5, wherein assembling a microphone hood includes placing a o-ring about an acoustic port of the faceplate.

7. The method of claim 5, wherein assembling a microphone hood to the faceplate includes snapping the microphone hood into an acoustic port of the faceplace.

8. The method of claim 2, wherein the making the housing comprises combining a shell and a bezel to define an access port.

9. The method of claim 4, wherein the combining the shell and bezel includes gluing the bezel to the shell.

10. The method of claim 1, wherein the method includes sealingly connecting the receiver to the housing opening.

11. The method of claim 10, wherein the sealingly connecting includes trimming the receiver.

12. The method of claim 1, wherein the hearing apparatus includes a power supply.

13. The method of claim 12, wherein the hearing aid housing includes terminals which connect to the power supply.

14. The method of claim 1, wherein the hearing aid housing is adapted to connect to a hearing aid programmer.

15. The method of claim 1 wherein placing a cover includes placing a cover having a battery holder.

16. The method of claim 1, wherein making a housing includes making a customized housing shaped for a particular user.

17. The method of claim 1, further comprises assembling wireless communication electronics to the microphone housing.

18. The method of claim 1, further comprising assembling telecoil electronics to the microphone housing.

19. The method of claim 1, further comprising assembling a microphone hood to the microphone housing.

20. The method of claim 19, wherein assembling a microphone hood includes placing a o-ring about an acoustic port of the microphone housing.

21. The method of claim 19, wherein assembling a microphone hood to the microphone housing includes snapping the microphone hood into an acoustic port of the microphone housing.

* * * * *